United States Patent [19]

Lemelson

[11] 4,012,188
[45] Mar. 15, 1977

[54] PRESSURE FORMING APPARATUS

[76] Inventor: Jerome H. Lemelson, 85 Rector St., Metuchen, N.J. 08840

[22] Filed: June 16, 1975

[21] Appl. No.: 587,532

Related U.S. Application Data

[63] Continuation-in-part of Ser. No. 170,625, Aug. 10, 1971, which is a continuation-in-part of Ser. No. 813,804, March 27, 1969, abandoned, which is a continuation-in-part of Ser. No. 501,174, Oct. 22, 1965, abandoned, which is a continuation-in-part of Ser. No. 393,292, Aug. 31, 1964, abandoned, and Ser. No. 559,232, Jan. 16, 1956, abandoned.

[52] U.S. Cl. .............................. 425/373; 425/224; 425/4 C; 264/175
[51] Int. Cl.² .......................................... B29C 15/00
[58] Field of Search .......... 425/223, 224, 373, 371, 425/4 C; 264/175, 212, 216; 100/151

[56] References Cited

UNITED STATES PATENTS

| | | | |
|---|---|---|---|
| 1,376,731 | 5/1921 | Ryan | 425/373 X |
| 2,500,728 | 3/1950 | Williams | 264/175 X |
| 2,526,318 | 10/1950 | Battin | 425/373 X |
| 3,085,292 | 4/1963 | Kindseth | 425/71 X |
| 3,216,059 | 11/1965 | Voelskow | 425/373 X |
| 3,241,182 | 3/1966 | Kessler | 425/373 X |

*Primary Examiner* — Robert L. Spicer, Jr.

[57] ABSTRACT

An apparatus and method are provided for continuously forming a plastic material, such as a thermoplastic polymer, under pressure against a drum containing irregular surface formations or cavities therein. In one form, injected plastic material is compressed between a bucking member and a substantial area of the surface of a forming drum. The molten casting or molding material is confined to a volume including a portion of the surface of the drum while pressure is applied thereto and until it solidifies. A bucking member such as an endless belt or otherwise shaped member defines a portion of the confined molding volume.

8 Claims, 6 Drawing Figures

U.S. Patent   Mar. 15, 1977   4,012,188

PRESSURE FORMING APPARATUS

RELATED APPLICATIONS

This is a continuation-in-part of application Ser. No. 170,625, filed Aug. 10, 1971, for Pressure Forming Apparatus and Method, which was a continuation-in-part of application Ser. No. 813,804, filed Mar. 27, 1969, now abandoned, as a continuation-in-part of Ser. No. 501,174 filed Oct. 22, 1965, now abandoned, a continuation-in-part of Ser. No. 393,292 filed Aug. 31, 1964 and having as a parent application Ser. No. 559,232 filed Jan. 16, 1956, now abandoned.

SUMMARY OF THE INVENTION

This invention relates to an apparatus and method for forming material, such as a thermoplastic polymer, between a drum and a bucking member wherein the drum is power rotated about its longitudinal axis to present different portions of its surface to the molding material and to advance the molded form to a point downstream of where it is introduced to the surface of the drum at which point it is solidified and may be removed from the drum surface without deforming. In particular, the invention is concerned with a process in which the molding material is introduced against the drum in a molten or otherwise formable condition and under substantially higher fluid injection pressure than is normally attainable by conventional sheet molding or embossing means. This is accomplished by specially shaping the drum, a bucking member which conforms to at least a portion of the surface of the drum and a molding technique in which a portion of the previously injected molding material solidifies in advance of that being injected and serves to partially seal the molding volume in cooperation with portions of the bucking member and drum which contact each other in sealing engagement. As a result, sheet-like material may be formed to shape under substantially higher pressures and conditions which are quite different from those experienced by conventional molding or embossing.

Accordingly, it is a primary object of this invention to provide a new and improved apparatus and method for molding material, such as a thermoplastic polymer, to shape between a drum and a bucking member.

Another object is to provide an apparatus and method for continuously forming an elongated formation of thermoplastic material of irregular configuration on a continuous basis.

Another object is to provide a molding method in which molding material is molded to shape between a drum and a bucking member in such a manner that molding pressures in the order of those experienced during injection molding are provided during the molding process, thereby permitting the formation of the material under conditions which are quite similar to those experienced during injection molding.

Another object is to provide a sheet forming method which may be employed to effect embossments in a sheet material coating or laminating sheet materials, at higher pressures than normally experienced during embossing or laminating.

Another object is to provide a pressure forming apparatus and method for a variety of materials such as polymers, metals and ceramics formed on a continuous basis by feeding such materials to a confined volume between a drum or roll, a bucking member, the feeding nozzle and solidified material located downstream of the point of entry of new material.

Another object is to provide a sheet or structural forming apparatus and method in which an elongated member is continuously formed and simultaneously molded to an irregular shape during the same operation in which it is formed.

Another object is to provide a calendaring or sheet embossing apparatus and method employing substantially higher pressures than used in conventional calendaring or embossing techniques.

Another object is to provide an apparatus and method for forming an elongated material against a drum or roll and for retaining said material thereagainst while it sets or cures so as to controllably retain the shape thereof.

Another object is to provide an apparatus and method for forming multiple layer sheet materials.

Another object is to provide improvements in a continuous casting apparatus and method.

Another object is to provide an apparatus and method for processing monomers continuously.

With the above and such other objects in view as may hereafter more fully appear, the invention consists of the novel constructions, combinations and arrangements of parts as will be more fully described and illustrated in the accompanying drawings but it is to be understood that changes, variations and modifications may be resorted to which fall within the scope of the invention as claimed.

Figure 1:
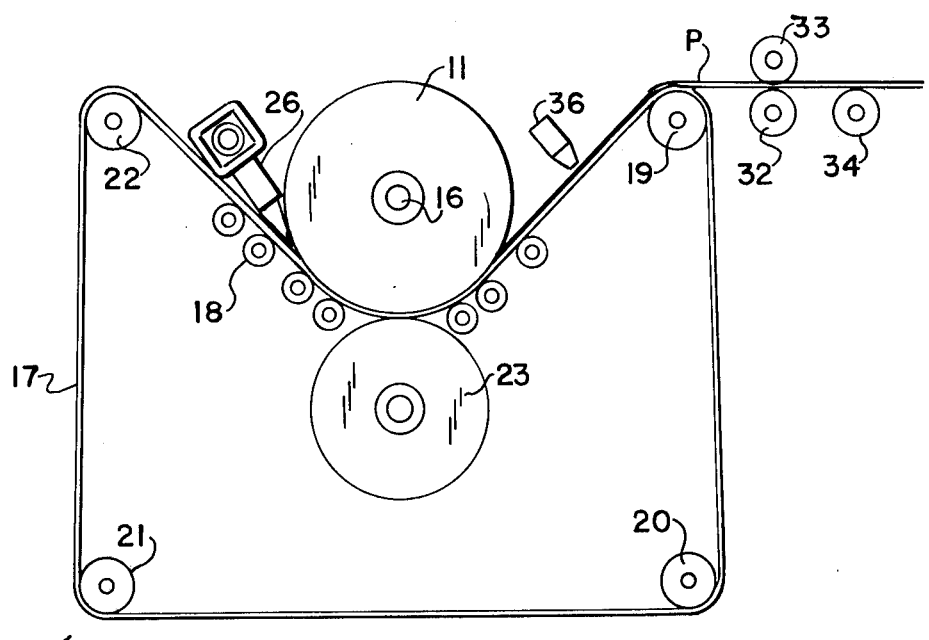
FIG. 1 is a side view illustrating apparatus for continuously forming and effecting secondary operations such as embossing, compressing or the like on sheet material.
Figure 2:
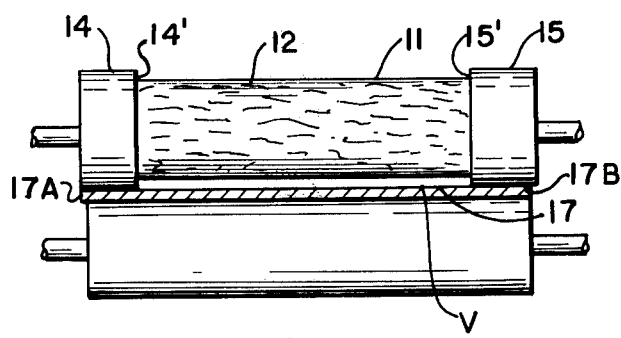
FIG. 2 is an end elevational view of a portion of the embossing roll assembly of FIG. 1.

FIGS. 1 and 2 illustrate an apparatus 10 for forming sheet material such as a molten thermoplastic resin, a thermosetting polymer or other suitable materials such as metal, ceramic or glass. The apparatus 10 employs an endless belt 17 which is power driven against and around end portions of a forming or molding drum 11, illustrated in FIG. 2 as containing a central portion 12 and cylindrically shaped end portions 14 and 15 against which end portions respective border portions 17A and 17B of the sheet 17 are retained and driven in the direction of rotation of drum 11 and preferably at the same speed as the surfaces of cylindrical end portions 14 and 15 so that there is no slippage between belt 17 and the drum.

While belt 17, which may be defined as a bucking member, is preferably made of a flexible sheet of metal such as stainless steel in the range of 1/32 to 3/32 thick depending on the size and configuration of drum 11, it may be made of any suitable flexible material which is capable of resisting deterioration or destruction by the heat, chemical action and pressures applied to the material being molded to shape, it may be made of any suitable metal, polymer or composite material.

As noted in FIG. 2, the central portion 12 of drum 11 is of smaller diameter than the diameter of the cylindrical end portions 14 and 15 of the drum, thereby providing an annular volume V between the central portion of sheet 17 and central portion 12 of drum 11. Into said annular volume V is injected under pressure a suitable molding compound such as a plastic polymer in a molten or semi-molten condition, various powdered materials such as a thermoplastic polymer which is rendered molten or sinterable in volume V, powdered metal and binding material which may be joined or sintered in volume V or made to form a continuous solid member such as a sheet therein whereafter it may be sintered further down the line, molten or metal or glass. An injection device 26 is provided to flow material P into the annular volume V as the sheet 17 is driven together with drum 11 to carry the injected material partly around the drum to at least a distance therealong wherein it may solidify before being removed from the surface of the drum 11. If the material injected into the volume V is a thermoplastic material such as a thermoplastic polymer, molten glass or metal, drum 11 is preferably internally cooled by flowing a heat transfer fluid therethrough so as to set the molten material during its travel around the power rotated drum 11, by the time it is removed from the surface of the drum. In other words, the material disposed in volume V is solidified downstream of the location at the end of the nozzle injecting same. The injection unit 26 may be configured, as will be described and illustrated in FIG. 3, to form a dynamic seal between the surface of sheet 17, the surface of the central portion 12 of drum 11 and the inner edges of the cylindrical end portions 14 and 15 of drum 11 so as to define a volume downstream of the end of the injection unit 26 and the solidified portion of injected material, which volume is totally enclosed by the solidified material and the surfaces of the drum 11 and sheet 17 permitting substantial pressure to be applied to the injected material without the escape of same from the confined volume.

A plurality of small rollers 18 engaged portions of the bottom surface of sheet 17 and maintain same in sliding frictional and sealing contact with the surfaces of cylindrical end portions 14 and 15 of drum 11. Notations 19, 20, 21 and 22 refer to respective rollers around which sheet 17 is power driven in an endless path by power rotating one or more of said rollers and/or by power rotating a cooperating drum 23 located in alignment with drum 11 and engaging a portion of sheet 17 against respective portions of the cylindrical end portions 14 and 15 of drum 11.

Drums 11 and 23 are respectively rotatably supported on their shafts 16 and 25 and are both preferably power rotated to cooperate in maintaining the seal between sheet 17 and the surfaces of end portions 14 and 15 of drum 11 and to power drive sheet or belt 17 therebetween. Notation 13 refers to irregular formations in the central portion 12 of drum 11 which may vary from simple embossing formations to cavities of substantial depth and extension into the surface of the central portion of the drum depending on the configurations desired to be formed of the material injected under pressure into the volume V and the volumes defined by said cavities. Notations 14' and 15' respectively refer to the inner radial surfaces of the cylindrical end portions 14 and 15 of drum 11 against which portions of the injection unit 26 ride in sealing engagement.

Figure 3:
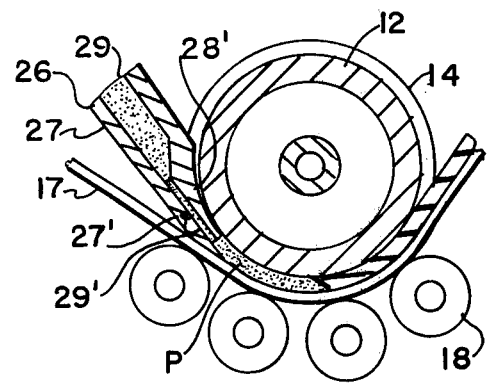
FIG. 3 is a side cross sectional view of part of the apparatus of FIG. 1.
Figure 4:
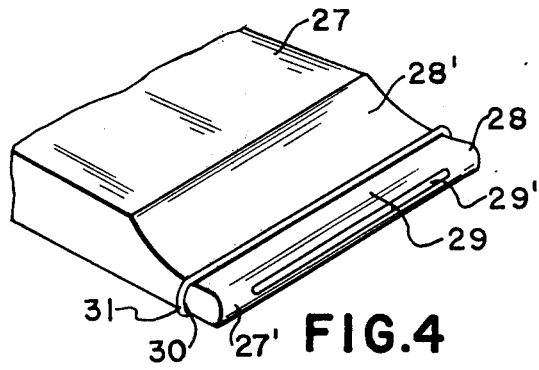
FIG. 4 is an isometric view of a material injector utilizable in the apparatus of FIG. 1
Figure 6:
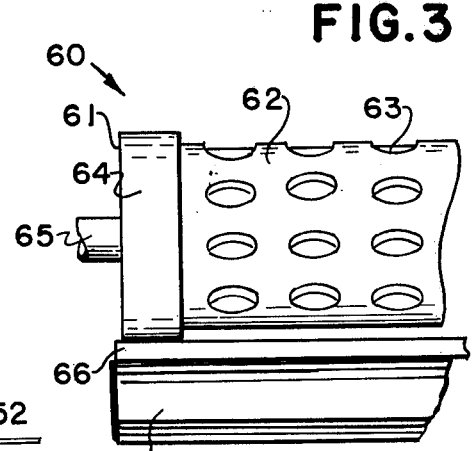

Injection unit 26 is shown in greater detail in FIGS. 3 and 4 and comprises a main body 27 which tapers to a nozzle head 27' and defines an inlet passageway 29 for the molding material. The inlet passageway 29 terminates at an elongated opening 29' at the end of head 27'. The surface 28 of the end of nozzle 27 contains a cylindrically shaped tapered portion 28' which is configured to frictionally and slidably engage with the central portion 12 of drum 11 while the side and undersurface portions of nozzle head 27' respectively engage surfaces 14' and 15' of drum 11 and the upper surface of belt or sheet 17. A dynamic fluid pressure seal is effected between the end portion 27' of the nozzle 27, the drum 11 and belt 17 by means of a sealing ring 31 disposed within a channel 30 formed in and circumscribing the end portion 27'. The sealing ring 31 may be made of an elastomeric material or a compressible polymer such as flexible polyurethane plastic or an elongated hollow tubular ring made of metal such as stainless steel, respective portions of which are compressed against the surfaces of drum 11, sheet 17 and the inner surfaces 14' and 15' of the cylindrical portions 14 and 15 of drum 11. In FIG. 3, four powered rolls 18a, 18b, 18c and 18d form a group 18 of such rolls which are preferably power rotated to drive sheet 17 against and with the power rotated drum 11.

In the operation of the apparatus illustrated in FIGS. 1–4, the nozzle 26 may be vibrated or oscillated during or between injections of material therefrom into volume V and may be controllably forced against drum 11 to maintain the seal between the side portions of cylindrical surface 28' of the nozzle and the surfaces of cylindrical formations 14 and 15.

The material injected into volume V through injection head 26 may be solidified per se, worked or cured or otherwise formed within said volume while the drum 11 is either power rotated by a constant speed motor or is intermittently rotated.

Cooling or curing means may also be disposed adjacent to belt 17 while it engages drum 11 and/or downstream thereof. In FIG. 1, a nozzle or bank of nozzles 36 are illustrated disposed above belt 17 for flowing one or more materials against the molded form or sheet P after it has left the surface of drum 11. Materials which may be ejected from nozzle 36 include air or other forms of coolant, curing or coating materials, etc.

From belt 17, the molded formation P may be power driven or otherwise processed in an apparatus which may include a plurality of powered rolls 32–34 which may be employed to convey the formation P away from the apparatus 10.

If the material injected into volume V is a thermosetting resin, drum 11 may be internally heated with electrical resistance heating means, a burning gas or other means for at least partially curing and solidifying the molding material while it is against the drum. Further heating and curing means may also be disposed downstream of the drum such as at the location of the nozzle 36 or further along the line.

In yet another embodiment of the invention, means may be provided upstream of the drum 11 for continuously forming a sheet of material, such as a polymer or other heat softenable material, and feeding same to the bite of drum 11 and bucking sheet 17. Such forming means may comprise an extruder or continuous casting machine.

In yet another embodiment of the invention, the endless bucking sheet 17 and the transport therefor may be replaced by a rigid plate or block having a surface which substantially conforms to the surface of the drum 11. Border portions of such a plate or block may frictionally engage cylindrical end portions 14 and 15 of drum 11 while the drum rotates or may be advanced into and out of contact with said cylindrical end portions in synchronization with the intermittent injection of predetermined quantities of molding material therebetween and the central portion 12 of the drum which contains the embossings or cavities 13 therein, such molding being effected in synchronization with the intermittent power rotation of drum 11 so as to form an elongated or molding therefrom which is intermittently removed from the drum.

Figure 5:
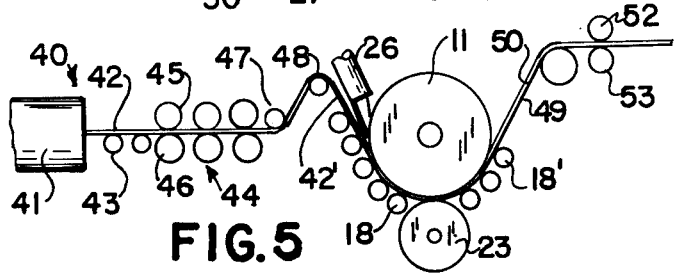
FIG. 5 is a side view of a modified form of the apparatus of FIG. 1.

FIG. 5 illustrates an apparatus for continuously forming a member such as a sheet of metal, glass or polymer and continuously coating same with a material as described. The apparatus 40 includes a first means 41 for continuously forming material 42. The apparatus 41 may comprise, if member 42 is made of metal, an extrusion of continuous casting machine operative to continuously form the member 42 and pass same to a powered take-off conveyor 43. The apparatus 41 may also comprise a machine for extrusion forming member 42 of any suitable polymer, a paper-board manufacturing machine, a machine for weaving cloth, a machine for forming a non-woven fabric on a continuous basis or any suitable apparatus for forming material 42 continuously which material is to be extrusion coated by the means situated therebeyond.

In one form of the invention, if the apparatus 40 is a continuously operative metal extrusion machine or metal continuous casting machine, the member 40 may be conveyed to a plurality of rollers 45 and 46 which are power operative and define one or more stages of a rolling mill 44 operative to perform one or more operations on member 42 such as rolling and/or drawing same to a suitable shape or thickness prior to its being fed to the laminating or coating apparatus 10 situated downstream thereof. Notations 47 and 48 refer to directional rollers between which may be situated means for taking up and controlling any slack which may develop in the continuously extruded or otherwise formed sheet 42 prior to entering the laminating-embossing apparatus 10.

Operation of the apparatus 10 is, as described, wherein rolls 18 are power driven and situated to compress the sheet portion 42' downstream of mill 44, against extrusion head 26 and the cylindrical surfaces of end formations 14 and 15 of roller 11. Notation 18' refers to power operative rollers engaging the side portions of the laminated assembly 49 of sheet 42' and the coating material 50 against the cylindrical surfaces of the side portions 14 and 15 of roller 11 until the material 50 has solidified and been worked thereon to a desired condition. Notation 51 refers to a roller disposed beyond rolls 18' over which the laminated assembly 49 is driven to a take-off conveyor such as power operative rolls 52 and 53.

As hereinbefore described, the various power driven devices of the apparatus of FIG. 5 are preferably all automatically controlled either by presetting same to control flow of the various materials and the means driving same or by means of generating feedback signals derived by sensing the motion of various portions of the moving material at different locations along its path of travel and utilizing said feedback signals by generating error or different signals in a simple computing apparatus, to correct the operation of the various servos feeding and driving material. In other words, the motors driving the various rolls of the rolling mill 44 and adjustably controllable and are automatically controlled by signals derived from sensing the speed of the material 42 extruded or continuously casted so as properly to operate thereon. In turn, material expressed from the head 26 is controlled in its flow into the cylindrical volume V by regulating a valve or controlling the servo operating the extrusion screw thereof, in accordance with signals derived from either measuring the rate of flow of the incoming material 42' and/or the back pressure on the material already injected into volume V. In other words, if the pressure head of the material immediately in front of the opening 29' at the end of nozzle or head 26, drops below a predetermined value such that insufficient flow or pressure will be maintained to derive the desired result, such drop in pressure may be sensed by suitable pressure sensing means mounted at a location such as 27' (see FIG. 4) at the end of the head 26, which sensing means may be utilized to generate a feedback signal operative to increase the speed of operation of the servo moving material through chamber 29 of the head 26. If, conversely, the pressure within volume V rises above a predetermined value, to prevent destruction of the sealing ring 31 or sideward extrusion of such material, the signal generated by sensing means 27' may be utilized to reduce the speed of said servo and therefore reduce the rate of flow of material to volume V.

It is noted that apparatus 40 of FIG. 5 which includes means for continuously forming a sheet or other shape and continuously operating thereon to change the shape thereof or laminate thereto, may be subject to a number of variations without departing from the spirit of the invention. For example, the rolling mill 44 may be operative to reduce the thickness of sheet 42 on a continuous basis and otherwise form same such as into any suitable structural shape including tubing, channels or the like and further means may be provided downstream of mill 44 for providing further secondary operations on the sheet prior to laminating or otherwise shaping same. Such further operations may include plating, coating or otherwise laminating material to either or both surfaces of the sheet portion 42', welding same, stamping or otherwise operating on said sheet prior to or after passing through apparatus 10 or in place of the operations performed by apparatus 10.

The apparatus illustrated in FIGS. 1-5 may be utilized for fabricating various sheet materials which are difficult, if not impossible, to fabricate by conventional embossing machinery. For example, it is herein proposed tht the apparatus of FIGS. 1-5 be utilized to fabricate sheet material containing embossed surfaces requiring precise dimensions for optical reflection purposes. Such articles as retro-reflectors containing pyramidal indentations in one surface thereof operative to reflex reflect light to the vicinity of a source directing said light thereagainst, have heretofore only been produced by injection molding same. Conventional embossing apparatus may be utilized to produce suitable retro-reflective material in sheet form due to distortion and uncontrollable shrinkage experienced thereby whereas the apparatus of FIGS. 1-5, which permits controlled high-pressure embossing of plastics such as acrylics, rigid and flexible binyls, cellulose acetate butyrates or glass may be utilized to produce same. Accordingly, the formations 13 in the surface of cylindrical embossing portion of drum 11 may comprise a plurality of precisely made pyramidal indentations and- /or protrusions operative to provide so called corner reflecting surfaces in the transparent sheet material embossed thereby.

In yet another form of the instant invention, the material injected from injection head 26 to fill the volume V may comprise a monomer which is either not polymerized while in said volume or only partly polymerizes therein whereupon suitable polymerizing means such as heat or radiation may be disposed downstream of the roll 11. Partial polymerization or freezing the monomer against guided sheet 17 by suitably cooling drum 11 may be effective in maintaining the shape of the sheet formed in the volume V unitl it is polymerized completely downstream thereof.

Materials which may be formed by means of the appartus illustrated in FIGS. 1–5 inclde such plastic polymers as polyethylene, polypropylene, polyurethane, polystyrene, polyvinyl chloride, and a variety of other thermoplastic and thermosetting resins as well as other materials such as metals including aluminum, magnesium, lead and other white metal compositions, ceramics and glass.

Further modifications to the apparatus 10 of FIGS. 1–4 are noted and include the following:

I. The material injected or extruded into the volume V between the roll 11 and the sheet 17 may have its border portions solidified or set prior to the solidification or setting of the central portion thereof so as to effect further means for laterally sealing the pressurized fluent material in the central portion of the sheet and preventing the outward flow thereof. If the material is thermoplastic material, simple cooling means, such as a gas or liquid, may be continuously flowed through the border portions 14 and 15 of the embossing roll 11 to more rapidly cool the border portions of the material in the volume V and to solidify same shortly after it is admitted to said volume. Material of the central portion of the volume V located a distance along the drum before it exits from between the drum and the sheet 17 is also preferably solidified so that when a seal is effected between the nose 28 of the injection head 26 and the surfaces of the drum and sheet 17, substantially high pressure may apply to said injection material for pressure forming same.

II. A substantially greater number of small wheels or rolls 18 than those illustrated in FIG. 1 may be provided so as to cooperate in forcing sheet 17 against the peripheral portions 14 and 15 of the drum 11 and to effect the desired fluid pressure seal therebetween. Staggered rolls 18 on both sides of the drum 11 may be utilized to apply in an almost uniform and continuous force against substantially the entire length of that portion of sheet 17 engaging the portions 14 and 15 of the drum.

III. The material admitted to the volume V may comprise a plastic monomer which is polymerized in situ in the volume V, thereby eliminating the need to inject a hot molten polymer. Furthermore, since most plastic monomers are of substantially lower viscosity than the molten polymers which they form when polymerized, substantially lower pressures may be required to provide surface formations in the sheet material formed thereof and, accordingly, the necessity of providing a suitable high-pressure seal to prevent back-flow or out-flow of the material being injected is eliminated.

Polymerization of a monomer fed to the volume V may be effected in one or more manners including: (a) the addition of a polymerizing material to the monomer just as or before it is injected to the volume V, (b) the heating of the monomer as and after it enters the volume V by heat conducted thereto through electrical resistance heating elements or other means provided in the drum 11, drum 23 and/or rollers 18, (c) pressure applied, as described, to the monomer fed to the volume V, (d) intense radiation applied to the monomer while it is in the volume V. The latter technique of utilizing radiation to polymerize the monomer in the volume V may involve the provision of a suitable source of radiation, such as a radioactive material or Van DeGaff generator disposed within one or more of the devices 11, 27 or 23 or located immediately adjacent thereto and operative to direct sufficient intense radiation to the material in volume V to polymerize same. In this connection, it is noted that the apparatus of FIGS. 1–4 may be utilized to polymerize and/or form a monomer on a sheet of material to which the monomer, when polymerized, will bond and form a laminate therewith.

IV. In the event that it is desired to form extremely fine surface filamentary formations of the material formed in the volume V, such may be effected by continuously forming a multitude of ice crystals on either or both the contacting surfaces of drum 11 or sheet 17, injecting a monomer, as described, into the volume V and polymerizing same in situ therein and within the interstices defined by the ice crystals, whereafter the monomer is polymerized, as described, so that its surface conforms to the shape of the ice crystals. Thereafter when the monomer has been polymerized in the form of an irregularly surfaced sheet, the ice crystals may be melted to provide a fine pile-like surfaced material.

In a modified form of the apparatus described, herein, a sheet of material such as metal, plastic or ceramic material may be fed between the sheet 17 and the drum 11 on a continuous basis so as to permit extrusion coating or laminating of the material fed from the extruder or injection head 26 to the volume between said sheet and the recessed surface of the drum 12. Said auxilliary sheet of material may be fed from a roll, or from means for continuously forming and feeding same such as an extruder, mill, rolling mill or other means. Because the material is confined as described against the sheet in the clearance volume V between said sheet and the drum, relatively thick coatings of low viscosity materials such as monomers or molten polymers may be formed and solidified, cured or polymerized in situ on said sheet. Sinterable plastic, metal or ceramic particles may also be fed to said auxilliary sheet disposed between sheet 17 and the drum of FIG. 3 and sintered in situ on said auxilliary sheet either while disposed against the drum 11 by heat applied through said drum or the rolls 18 or downstream of said drum.

In yet another form of the instant invention, a plurality of reinforcements such as wires, filaments, strips, elongated whiskers or other devices may be continuously fed to the volume V through openings in the head 26 or under said head to become encapsulated in the resulting material formed in volume V.

It is also noted that either or both the rolls 11 and 23 may be suitably vibrated during the described operation in a manner to facilitate the flow of material thru the apparatus.

In the apparatus hereinbefore described, the roller guided sheet 17, which is utilized to maintain the material P injected under pressure therebetween and the surface of the central portion 12 of the forming or embossing roll 11, may be replaced by a supply of said sheet material fed from a coil or continuously fabricated by extrusion or other suitable means on the production line. While the sheet 17 is preferably a thin, flexible sheet of metal such as stainless steel, aluminum or the like it may comprise any suitable material capable of cooperating in the formation of material P as illustrated in FIG. 3 and, in certain instances, forming a covering or base support for the resultant composite sheet on which the material P is extrusion coated and compressed or embossed. Such guided sheet 17 may comprise, in addition to a sheet of metal, another suitable resin fed from a coil formation or continuously formed as by extrusion upstream of the laminating apparatus 10, paperboard or other suitable laminating materials. If provided as paperboard, the sheet 17 may be provided from a coil formation thereof or may also be continuously formed by conventional papermaking machinery and fed on a continuous basis to the lamination or extrusion coating apparatus 10 or any suitable variation thereof. Such an apparatus which would supply the sheet 17 to become laminated with the material P, would preferably be adjustable in its ability to control the output speed of the continuously fabricated sheet 17 as would the speed of the means for power operating the rollers 18, 11, 23, and 35 of FIG. 1 which are utilized to feed sheet 17 through the apparatus 10. Other variables which are preferably controllable in rate would be the means for moving the coating material P through the extrusion head 26. All of said variable output means would preferably include means for measuring the speed of each and sensing variations in the means producing sheet 17 and feeding material P

I claim:

1. An apparatus for molding comprising:
a first molding member including a cylindrical drum,
means for rotationally supporting said drum for rotation about its longitudinal axis,
means for power rotating said drum,
a second molding means having a cylindrical surface conforming to the cylindrical surface of said drum,
means for supporting said second molding means with said cylindrical surface thereof disposed a distance away from a substantial portion of the cylindrical surface of said drum to provide an annular volume between said second molding means and said cylindrical surface of said drum, and
means for sealing the longitudinal edge portions of said second molding means and said cylindrical surface of said drum,
means for injecting a thermoplastic material in a plastic condition under pressure into said annular volume wherein said thermoplastic material is made to conform to said annular volume,
means for solidifying a first portion of the material injected between the annular surface between said drum and said second molding means,
said second molding means extending partially around said drum a sufficient distance to permit the molten thermoplastic material injected into said annular volume to solidify within said annular volume between said second molding means and said drum,
means for retaining said molten thermoplastic material within said annular volume and preventing the flow of said molten material laterally outwardly from said annular volume as it is injected therein by said injection means until it is at least solidified therein, and
means located beyond the end of said second molding means and the annular volume defined by said second molding means and the cylindrical surface of said drum for guiding the solidified shape formed of said thermoplastic material in said annular volume away from said drum.

2. An apparatus for molding in accordance with claim 1 wherein said drum contains a plurality of cavities formed in its cylindrical surface and said cavities communicate with said annular volume between said second molding means and said drum whereby portions of said molten thermoplastic material flow respectively into respective of said cavities and form respective portions of said molded material which protrude from the portion thereof formed between the cylindrical surface and said second molding means.

3. An apparatus for molding in accordance with claim 2 including means for cooling said drum to transfer heat from said thermoplastic molding material to permit the setting of said molding material after it is injected into said annular volume and said cavities in said drum.

4. A molding apparatus in accordance with claim 3 wherein said annular volume between said second molding means and said surface of said drum is shaped to provide at least a portion of the molding formed between said drum and said second molding means in the configuration of a sheet or strip of said thermoplastic material.

5. An apparatus for molding comprising:
a rotary drum having a central portion having at least one depression therein and surface portions to the sides of said depression being cylindrically shaped,
means for rotationally supporting said drum for rotation about its longitudinal axis,
means for power rotating said drum,
a bucking means,
means for supporting said bucking means to provide a molding volume between said bucking means and the surface of said drum,
means for injecting a thermoplastic material in a plastic condition under pressure into said molding volume wherein said thermoplastic material is made to conform to said molding volume and said cavities formed in the surface of said drum,
means for solidifying a first portion of the material injected between the annular surface between said drum and said bucking means,
said bucking means extending partially around said drum a sufficient distance to permit the molten thermoplastic material injected into said molding volume to solidify between said bucking means and said drum,
means for retaining said molten thermoplastic material within said molding volume and preventing the flow of said molten material laterally outwardly from said molding volume as it is injected therein by said injection means until it is at least solidified therein,
means located beyond the end of said bucking means and the molding volume defined by said bucking means and the cylindrical surface of said drum for guiding the solidified shape formed of said thermoplastic material in said molding volume away from said drum.

6. An apparatus for molding in accordance with claim 5 wherein said drum contains a plurality of cavities formed in its outer surface between said cylindrical surface portions, said cavities defining respective portions of said molding volume between said bucking means and said drum whereby portions of said molten thermoplastic material flow respectively into respective of said cavities and form respective portions of the molded material which protrude from the portion thereof formed between the cylindrical surface and said bucking means.

7. An apparatus for molding in accordance with claim 6 including means for cooling said drum to transfer heat from said thermoplastic molding material to permit the setting of said molding material after it is injected into said molding volume and said cavities in said drum.

8. A molding apparatus in accordance with claim 6 wherein said annular volume between said bucking means and said surface of said drum is shaped to provide at least a portion of the molding formed between said drum and said bucking means in the configuration of a sheet or strip of said thermoplastic material.

* * * * *